United States Patent [19]

Booth et al.

[11] 4,022,850

[45] May 10, 1977

[54] SELF-SEALING FILMS

[75] Inventors: David Andrew Booth, Overijse; William James Busby, Tervueren, both of Belgium; Jean Paul Loree, Nohanent, France

[73] Assignee: Exxon Research and Engineering Company, Linden, N.J.

[22] Filed: June 13, 1975

[21] Appl. No.: 586,641

Related U.S. Application Data

[63] Continuation of Ser. No. 424,772, Dec. 14, 1973, abandoned.

[52] U.S. Cl. .......................... 260/897 B; 260/829; 264/95
[51] Int. Cl.² ..................................... C08L 23/08
[58] Field of Search .................. 260/897 B, 829

[56] References Cited

UNITED STATES PATENTS

| | | | |
|---|---|---|---|
| 3,321,427 | 5/1967 | Tyran | 260/28.5 |
| 3,468,978 | 9/1969 | Battersby | 260/897 |
| 3,615,106 | 10/1971 | Flanagan et al. | 260/897 X |

FOREIGN PATENTS OR APPLICATIONS

| | | | |
|---|---|---|---|
| 1,024,718 | 4/1966 | United Kingdom | 260/897 |

*Primary Examiner*—Carman J. Seccuro
*Attorney, Agent, or Firm*—Henry E. Naylor

[57] ABSTRACT

A transparent self-sealing film suitable for packaging is made from a composition comprising (i) 90 to 99.95 wt. % of a copolymer of ethylene and a vinyl (or hydrocarbyl substituted vinyl) ester of a $C_1$–$C_{30}$ monocarboxylic acid (vinyl acetate) containing at least 89 wt. % (e.g., 91 to 95 wt. %) of ethylene and (ii) either 0.05 to 10 wt. % of a hydrocarbon resin, or 0.05 to 5 wt. % of liquid polyisobutylene or liquid polybutylene (MW 30,000 to 50,000) or a combination of 0.05 to 10 wt. % of the hydrocarbon resin and 0.05 to 5 wt. % of polyisobutylene or polybutylene, provided the combined weight of hydrocarbon resin and polyisobutylene or polybutylene is not more than 10 wt. %.

12 Claims, No Drawings

SELF-SEALING FILMS

This is a continuation of application Ser. No. 424,772, filed Dec. 14, 1973, now abandoned.

BACKGROUND OF THE INVENTION

This invention relates to self-sealing packaging films.

Self-sealing packaging films are known and are used in shops for example, for wrapping and display of food in refrigerated display units.

Various materials have been used for such films, the most common being PVC and polyolefin. However, these films suffer from various disadvantages and have not been completely satisfactory in use.

We have now discovered a composition which can be made into a stretch and seal film. According to this invention a transparent self-sealing film is made from a composition comprising (i) 90–99.95 wt. % of a copolymer of ethylene and a vinyl (or hydrocarbyl substituted vinyl) ester of a $C_1$-$C_{30}$ monocarboxylic acid containing at least 89 wt. % of ethylene, and (ii) either 0.05 to 10 wt. % of a hydrocarbon resin, or 0.05 to 5 wt. % of liquid polyisobutylene or liquid polybutylene or a combination of 0.05 to 10 wt. % of the hydrocarbon resin and 0.05 to 5 wt. % of the polyisobutylene or polybutylene provided the combined weight of hydrocarbon resin and polyisobutylene or polybutylene is not more than 10 wt. %.

Concerning the ethylene copolymer and carboxylic acid is preferably aliphatic, and saturated and preferably mono-carboxylic. Thus, one may use vinyl propionate, vinyl hexoate, vinyl octanoate, vinyl dodecanoate, vinyl behenate, or isopropenyl acetate. The particularly preferred ester is vinyl acetate. The resulting polymer should preferably contain from 91 to 95 wt. % of ethylene.

One method of preparing the copolymers involves feeding the monomers into a tubular reactor which has been previously purged with nitrogen. A small amount of oxygen, usually 0.005 to 0.05 wt. % based on the weight of ethylene is also introduced into the reactor. Alternatively a peroxide initiator, e.g. di-t-butyl peroxide, or a mixture of peroxide initiator and oxygen may be introduced into the reactor in place of oxygen alone. A solvent (e.g. benzene, water, saturated hydrocarbons, methanol) may also be employed in the reaction. The pressure is maintaned between 60 and 2700 atmospheres (900 and 40,000 p.s.i.g.), preferably between 135 and 2000 atmospheres (2,000 and 30,000 p.s.i.g.). The temperature should be maintained between 40° C. and 300° C., preferably between 70° C. and 250° C.

Another method of preparing the copolymers is via a batch process. Such a process requires a solvent for the reactants, the solvent being for example toluene or hexane. The preferred solvent however is benzene. The reaction initiator may be any peroxy compound, preferably di-t-butyl peroxide. The temperature of the polymerization reaction is dependent upon the particular peroxide initiator employed and should be high enough for sufficient decomposition of the initiator to occur. This temperature will usually be between 40° C. and 300° C.

For the preferred initiator, i.e. di-tert-butyl peroxide, the most suitable temperature is between 130° C. and 160° C. The pressure should be between 60 and 1000 atmospheres (900 and 15000 p.s.i.g.), and preferably being between 75 and 470 atmospheres (1100 and 7000 p.s.i.g.). The autoclave or similar equipment containing the solvent, initiator and vinyl or hydrocarbyl substituted vinyl ester is purged with nitrogen and then with ethylene before charging with a sufficient amount of ethylene to yield the desired pressure when heated to the reaction temperature. During the polymerization additional ethylene is added to maintain the pressure at the desired level. Further amounts of initiator and/or solvent, and/or vinyl and hydrocarbyl substituted vinyl ester may also be added during the reaction. On completion of the reaction, free solvent and unreacted monomers are removed by stripping or some other suitable process yielding the desired polymer.

Another method of making a suitable copolymer is to compound a high vinyl carboxylate (e.g. vinyl acetate) copolymer with polyethylene to obtain the suitable vinyl carboxylate level and melt flow index.

The ethylene copolymer should preferably have a melt index (as defined in ISO.R92 using a temperature of 190° C. and a load of 2.16 Kg.) of 0.2 to 20, especially 1.5–3.0.

The hydocarbon resin may be a polyterpene resin or a resin obtained by the polymerization of a cracked petroleum distillate fraction. The polymer is then preferably hydrogenated to yield a very light colored product.

Although various petroleum distillate fractions may be used, the preferred feed-stocks are those having a relatively wide boiling range, e.g. 20° C. to 280° C.

Before polymerization takes place the cracked petroleum distillate fraction is preferably heat-soaked, e.g. at a temperature above 100° C. e.g. 130° C. to 140° C., for a period of less than one hour so as to dimerize the cyclic dienes. The heat-soaked feed is thereafter distilled and the desired fraction, e.g. one boiling between 80° C and 180° C., vacuum distilled to obtain the desired cut to be polymerized.

The preferred fractions are those which comprise compounds having one or more unsaturated rings in the molecule, such as cyclodienes, cycloalkenes, indenes, etc., in particular the fractions boiling above 100° C.

Polymerization preferably takes place without a cayalyst, i.e. thermal polymerization at a preferred temperature of 240° C. to 320° C., e.g. about 250° C. The thermal polymerization is preferably carried out in an inert atmosphere, e.g. $N_2$, at a pressure of 10–12 atmospheres for 1 to 9 hours. If desired, polymerization can take place using a Friedel-Crafts cayatyst, such as $AlCl_3$, $BF_3$, $SnCl_4$, $TiCl_4$ at a temperature of −100° C. to +95° C., e.g. 0° C. to 55° C.

When the polymer is subjected to hydrogenation, the polymer is first preferably dissolved in a saturated hydrocarbon solvent such as heptane, in a proportion of for example 20 to 60% by weight in relation to the polymer solution.

Suitable hydrogenation catalysts include nickel, reduced nickel, nickel-tungsten sulfide, molybdenum sulfide, and a preferred catalyst is a pre-activated catalyst on a Kieselguhr support containing about 58% by weight of nickel, the specific area being about 140 m²/g and the ratio: (reduced nickel/total nickel) being about 0.66. Suitable proportions of catalyst are from 5 to 20% by weight, e.g. 7 to 13% by weight, based on weight of resin.

Hydrogenation preferably takes place at 215° to 270° C. e.g. about 215° C. at a pressure of 40 to 60 atmospheres, e.g. 45 atmospheres, for a period up to 3 hours, e.g. about 2 hours.

After cooling, the solution of polymer should be filtered to eliminate traces of catalyst and obtain a clear solution free from all impurities.

The solution is then distilled under nitrogen and thereafter steam distilled at a temperature not exceeding 260° C.

The resin thus obtained usually has a Gardner color of 1 to 3, a bromine number of 1 to 20 and a ballring softening point of about 100° C.

A preferred resin derived from a petroleum distillate fraction is a hydrogenated polycyclopentadiene resin.

Suitable hydrocarbon resins also include coumarone-indene resins and hydrogenated coumarone-indene resins.

The liquid polyisobutylene or polybutylene preferably has a viscosity average molecular weight (Flory method) of 30,000 to 50,000.

The preferred proportions of ethylene copolymer and hydrocarbon resin, polyisobutylene or polybutylene are 96 to 99 wt. % of ethylene copolymer and 1 to 4 wt. % of hydrocarbon resin, polyisobutylene or poylbutylene and 92 to 96 wt. % of ethylene copolymer and 3 to 6 wt. % of hydrocarbon resin plus 1-2 wt. % of polyisobutylene or polybutylene.

After mixing the constituents of the composition of the invention, the desired stretch and seal film can be made either by tubular blowing or by chill roll casting. In the tubular blowing method, the copolymer and resin containing mixture in the molten state is forced around a mandrel inside a die and extruded through the die opening as a tube. The tube while still in the melt state is expanded to a hollow cylinder of desired diameter by blowing with air admitted through the center of the mandrel. The chill roll casting method results in a more tacky, more elastic film with better visual appearance. In the chill roll casting method, the hot melt extruded through a die slot is cooled by the surface of two or more water-cooled chill rolls. Films having thicknesses of between 10 and 100 microns are preferred. If desired, the films can be colored provided they remain transparent.

EXAMPLE 1

90 parts by weight of an ethylene-vinyl acetate copolymer having a melt index of about 2 and containing 5 wt. % vinyl acetate was tumbled with 10 parts by weight of a masterbatch containing 30 wt. % of a petroleum resin and 70 wt. % of the ethylene-vinyl acetate copolymer. The mixture was then extruded from a flat die at a melt temperature of 250° C. onto a chill roll cooled with water at 15° C. The resultant film was 20 microns thick and had excellent and lasting blocking or tack, and was extremely elastic.

EXAMPLE 2

100 parts by weight of the ethylene-vinyl acetate copolymer used in Example 1 were mixed with 3.5 parts by weight of a petroleum resin in a 50 lb. high speed powder blended for 30 seconds.

The resultant mixture was fed directly to the hopper of a 4.5 inch extruder fitted with a long 30/1 L/D ratio mixing screw. After extruding a 700 lb/hr at temperatures of 200°–240° C., 40 rods 1/8 inch in diameter were extruded, cooled in a water bath, and chopped into pellets 1/8 to 1/4 inches long. This compound was then extruded at 260° C. on a 2½ inch extruder to give a blown film 13 inches layflat width. The edges were trimmed to give two films each 12 inches wide, which were wound onto a suitable mill roll. Lengths of 90 feet were rewound onto individual tubes for more convenient use when the film was not being used industrially.

EXAMPLE 3

99 parts by weight of an ethylene vinyl acetate copolymer containing 10 wt. % vinyl acetate were mixed with 1 wt. % of a liquid polyisobutylene rubber (viscosity average MW of 30,000–50,000) in a 2 lb internal rubber mixer of the Banbury type. The resultant mixture was discharged and sheeted out on a rubber mill to 1/8 inch thickness and cooled. The mixture was then granulated mechanically by a rotating high speed plastics cutter.

The granulate was fed directly to the hopper of an adiabatic type polyethylene blown film unit. Standard low-density polyethylene conditions were employed using a blow-up ratio of 2.2 to 1 from a 120 mm diameter die, and film 20 microns thick was edge slit and wound separately onto take up rolls. The polyisobutylene was observed to enhance film strength and elasticity; it gave better clarity with lower haze, and contributed good tear, gloss and cling properties.

EXAMPLE 4

1.25 weight % of the polyisobutylene used in Example 3 was heated to 120° C. and mixed in the manner of hot melt adhesives with 3.75 wt. % of a petroleum resin at the same temperature. The mass was allowed to cool and crystallize. The mixture was then crushed or ground into a fine powder. Various methods (Hammer mill, mechanical granulator, ball mill) could be used to achieve this. (If not used immediately the powder may be stabilized by addition of small amounts (say 1.25 wt. %) of zinc stearate, silica dust or talcum.)

5 wt. % of the prepared powder was tumble blended with 95 wt. % of an ethylene vinyl acetate copolymer containing 8 wt. % vinyl acetate. The blend was extruded into rods and cut into pellets in the same manner as outlined in Example 2. The granulate was processed into film using the equipment detailed in Example 3. Blown film 20 microns thick was produced having excellent strength, tear and cling properties, with good gloss, clarity and low haze. The powder was observed to impart sparkle to the film with additional stiffness when compared to the product of Example 3.

What is claimed is:

1. A transparent self-sealing tubular blown, elastic film made from a composition comprising (i) 90 to 99.95 wt. % of a copolymer of ethylene and a vinyl (or hydrocarbyl substituted vinyl) ester of a $C_1$–$C_{30}$ monocarboxylic acid containing at least 89 wt. % of ethylene and at least 5 wt. % of said vinyl ester wherein said copolymer has a melt index of about 0.2 to about 20 and (ii) either 0.05 to 10 wt. % of a hydrocarbon resin selected from the group consisting of polyterpenes, coumarone-indene resins, and polymers from petroleum distillate fractions, or 0.05 to 5 wt. % of liquid polyisobutylene or liquid polybutylene or a combination of 0.05 to 10 wt. % of the hydrocarbon resin and 0.05 to 5 wt. % of the polyisobutylene or polybutylene, provided the combined weight of hydrocarbon resin and polyisobutylene or polybutylene is not more than 10 wt. %.

2. A film according to claim 1 wherein the vinyl ester from which the copolymer is derived is vinyl acetate.

3. A film according to claim 1 wherein the hydrocarbon resin is a resin obtained by the polymerization of a cracked petroleum distillate fraction.

4. A film according to claim 3 wherein the cracked petroleum distillate fraction has been hydrogenated.

5. A film according to claim 3 wherein said fraction comprises compounds having one or more unsaturated rings in the molecule.

6. A film according to claim 1 which comprises 96 to 99 wt. % of the ethylene copolymer and 1 to 4 wt. % of the hydrocarbon resin, polyisobutylene or polybutylene.

7. A film according to claim 1 which comprises 92 to 96 wt. % of ethylene copolymer and 3 to 6 wt. % of hydrocarbon resin plus 1 to 2 wt. % of polyisobutylene or polybutylene.

8. A film according to claim 1 wherein the copolymer contains from 91 to 95 wt. % of ethylene.

9. A film according to claim 1 wherein the ethylene copolymer has a melt index (as defined in ISO.R92 using a temperature of 190° C. and a load of 2.16 Kg) of 0.2 to 20.

10. A film according to claim 9 wherein the melt index is 1.5 to 3.0.

11. A film according to claim 1 wherein the resin is a hydrogenated polycyclopentadiene resin.

12. A film according to claim 1 wherein the polyisobutylene or polybutylene has a viscosity average MW of 30,000 to 50,000.

* * * * *